(12) United States Patent
Vander Lind (10) Patent No.: US 10,472,075 B2
(45) Date of Patent: Nov. 12, 2019

(54) PNEUMATIC PARACHUTE DEPLOYMENT SYSTEM

(71) Applicant: Kitty Hawk Corporation, Mountain View, CA (US)

(72) Inventor: Damon Vander Lind, Oakland, CA (US)

(73) Assignee: Kitty Hawk Corporation, Palo Alto, CA (US)

( * ) Notice: Subject to any disclaimer, the term of this patent is extended or adjusted under 35 U.S.C. 154(b) by 215 days.

(21) Appl. No.: 15/357,913

(22) Filed: Nov. 21, 2016

(65) Prior Publication Data
US 2018/0141668 A1    May 24, 2018

(51) Int. Cl.
*B64D 17/72*    (2006.01)
*B64D 17/80*    (2006.01)

(52) U.S. Cl.
CPC .............. *B64D 17/72* (2013.01); *B64D 17/80* (2013.01)

(58) Field of Classification Search
CPC ........ B64D 17/80; B64D 17/72; B64D 17/62; B64D 25/00; B64D 17/725; B64D 17/02
See application file for complete search history.

(56) References Cited

U.S. PATENT DOCUMENTS

| | | | |
|---|---|---|---|
| 1,019,271 A * | 3/1912 | Nelson | B64D 17/72 244/139 |
| 1,556,502 A * | 10/1925 | Doucett | B64D 25/12 244/139 |
| 2,013,495 A | 9/1935 | Doss | |
| 3,072,372 A | 1/1963 | Lowry | |
| 3,097,819 A | 7/1963 | Raistakka | |
| 3,352,519 A * | 11/1967 | Tatsusaburo | B64D 17/00 244/139 |
| 3,622,108 A * | 11/1971 | Mathewson | B64D 17/80 244/139 |
| 4,408,737 A * | 10/1983 | Schwaerzler | B64D 17/80 244/110 D |
| 4,813,636 A * | 3/1989 | Lindgren | B64D 17/343 244/152 |
| 5,028,018 A | 7/1991 | Krebber | |
| 5,303,883 A | 4/1994 | Brewer | |
| 8,191,831 B2 * | 6/2012 | Nadir | B64C 39/024 244/139 |
| 9,522,733 B2 * | 12/2016 | Heppe | B64B 1/06 |
| 2002/0070315 A1 * | 6/2002 | Hilliard | B64D 17/025 244/139 |
| 2007/0145193 A1 * | 6/2007 | Hakki | B64D 17/80 244/139 |
| 2010/0018724 A1 * | 1/2010 | Cleary | B64D 1/12 169/46 |
| 2010/0032527 A1 * | 2/2010 | Fox, Jr. | B64D 17/02 244/152 |

(Continued)

*Primary Examiner* — Assres H Woldemaryam
(74) *Attorney, Agent, or Firm* — Van Pelt, Yi & James LLP (57) ABSTRACT

A pneumatic parachute deployment system is disclosed. In various embodiments, a pneumatic parachute deployment system as disclosed herein includes a bladder configured to control a parachute's expansion in at least one dimension, and an inflation mechanism configured to inflate the bladder. The bladder is inflated when the parachute is deployed, and in various embodiments may be used to speed deployment of the parachute and/or restrict the parachute to opening at least initially only to a limited extent.

17 Claims, 10 Drawing Sheets

(56) References Cited

U.S. PATENT DOCUMENTS

2015/0314881 A1\* 11/2015 Tsaliah .................. B64D 17/72
 244/146
2017/0225792 A1\* 8/2017 Wang ..................... B64D 17/70

\* cited by examiner

PNEUMATIC PARACHUTE DEPLOYMENT SYSTEM

BACKGROUND OF THE INVENTION

In many aviation applications there is a need for a recovery system that is adaptable to various flight conditions. Weight limitations may constrict an aircraft to a single parachute. A mechanism may be required to adapt the parachute to differing conditions.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A pneumatic parachute deployment system is disclosed. The system comprises a bladder configured to control a parachute's expansion in at least one dimension and an inflation mechanism configured to inflate the bladder. The bladder may be configured to fill with air upon parachute deployment and control a radius of an opening of the parachute. The bladder may be positioned within or near the opening of a parachute. The bladder may push the opening of the parachute wider as the bladder inflates.

The bladder may be a pneumatic bladder that quickly fills with air when triggered. The bladder may be a tube shape. One or more bladders may be used. In some embodiments, a parachute comprises a large, main opening at its base and a smaller opening atop the parachute. The bladder may be positioned inside or below a canopy of the parachute near the main opening of the parachute. In a packed state, the parachute's canopy material may be held together tightly. The bladder may push out sections of the canopy that are near the main opening of the parachute, causing the parachute to open quickly. A pneumatic parachute deployment system may be used to hasten parachute deployment by causing the parachute to fill with air in a short period of time. The system may be used to slow parachute deployment by securing the pneumatic bladder to the parachute. The bladder may restrain the parachute from inflating past a predetermined threshold. The system may perform actions based on flight conditions.

Figure 1A:
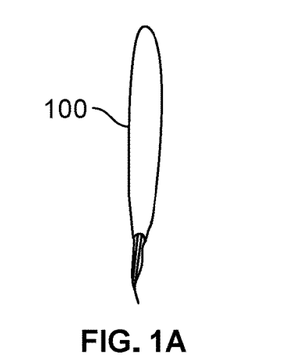
FIG. 1A is a diagram illustrating an embodiment of a parachute before pneumatic bladder deployment.

FIG. 1A is a diagram illustrating an embodiment of a parachute before pneumatic bladder deployment. In some embodiments, as a parachute is deployed, it is pulled upwards away from an aircraft. For example, the parachute may be deployed using a rocket that is attached atop the parachute. The parachute may be released while the aircraft is falling, causing the parachute to be pulled upwards. Upon initial deployment, the parachute may be an oblong shape.

In the example shown, parachute 100 is pulled taut or mostly taut along its vertical axis. Parachute 100 may show a parachute during initial stages of deployment. The parachute as shown is not filled with air. Parachute 100 as shown has an opening at its base, where tethers are attached. In a standard parachute deployment system, air may enter the parachute from the opening until the parachute is filled. The opening may gradually widen as air enters.

Figure 1B:
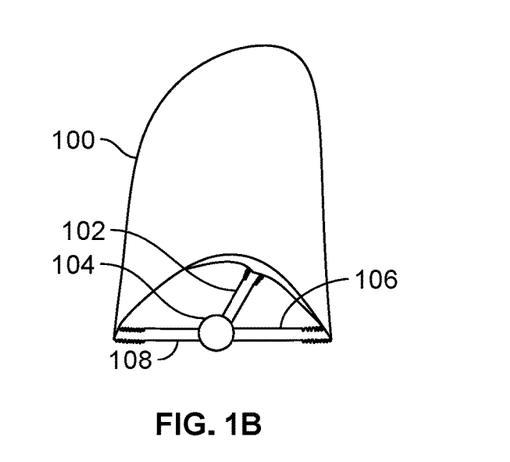
FIG. 1B is a diagram illustrating an embodiment of parachute deployment using a pneumatic parachute deployment system.

FIG. 1B is a diagram illustrating an embodiment of parachute deployment using a pneumatic parachute deployment system. In the example shown, three pneumatic bladders are deployed. Pneumatic bladders 108, 102, and 106 extrude from attachment 104. Attachment 104 may be positioned in parachute 100's center. The pneumatic bladders may push edges of the parachute's canopy out and away from the parachute's center. As shown, the pneumatic bladders are folded or bunched at ends of the bladders that are touching the canopy. The pneumatic bladders may be in the process of expanding. The bladders may be inflated from the ends of the bladders adjacent to attachment 104. Attachment 104 may comprise a mechanism that causes the bladders to inflate. The attachment may be secured to an aircraft. The pneumatic bladders may be triggered to deploy simultaneously with the parachute. A timing device may be used to trigger the pneumatic bladders after a predetermined elapsed time period following release of the parachute.

Figure 1C:
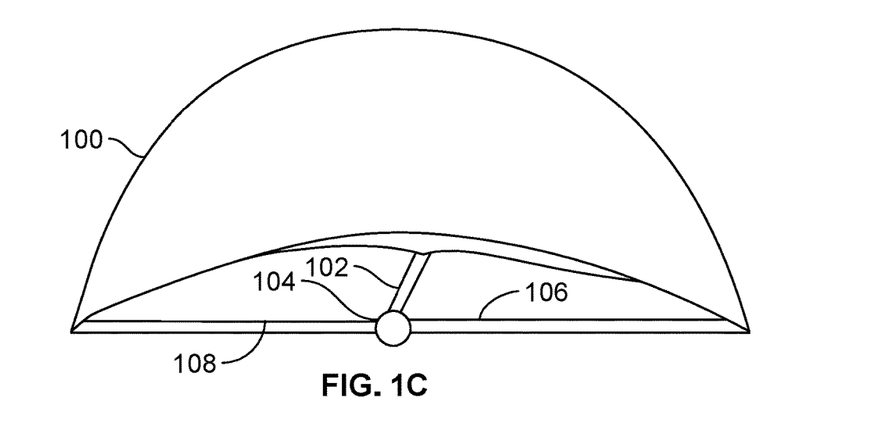
FIG. 1C is a diagram illustrating an embodiment of a parachute using a pneumatic parachute deployment system after pneumatic bladders have been deployed.

FIG. 1C is a diagram illustrating an embodiment of a parachute using a pneumatic parachute deployment system after pneumatic bladders have been deployed. In the example shown, pneumatic bladders 108, 102, and 106 are fully expanded. They have pushed the edges of parachute 100's opening. Parachute 100 is fully filled with air. In some embodiments, multiple pneumatic bladders are used. The bladders may inflate radially from a center point of the parachute opening. In some embodiments, a continuous bladder is used that passes through the center point of the parachute opening.

Figure 2A:
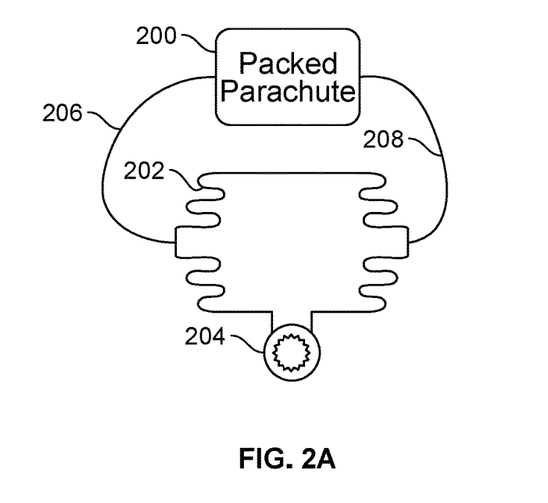
FIG. 2A is a diagram illustrating an embodiment of a pneumatic parachute deployment system.

FIG. 2A is a diagram illustrating an embodiment of a pneumatic parachute deployment system. The example shows a pneumatic parachute deployment system in a packed state. In the example shown, pneumatic bladder 202 is shown in a packed position. The bladder may be comprised of a fabric or a light, flexible material. The bladder may be folded into itself multiple times. Bladder 202 may be designed to expand both to the left and to the right.

In some embodiments, a gas generator is used to fill the pneumatic bladder. In the example shown, gas generator 204 is positioned below bladder 202. An airbag charge may be used. An electrical impulse may be provided to the gas generator in the event the pneumatic parachute deployment system is triggered. The electrical impulse may ignite an element inside the gas generator that causes it to rapidly produce gas. A fan (e.g. electric ducted fan), hybrid gas generator, compressed air, or any other appropriate mechanism may be used. A hybrid gas generator comprising both an airbag charge and compressed air may be used.

Packed parachute 200 may be stored above or around pneumatic bladder 202. In the example shown, packed parachute 200 is attached to pneumatic bladder 202 via tethers 206 and 208. The tethers may attach to the canopy of the parachute. The parachute may be packed with its opening around packed bladder 202 with excess fabric folded or coiled tightly. Pneumatic bladder 202 and gas generator 204 may be enclosed in a container that is separates when the bladder is deployed. The container may explode off or be detached. The bladder and gas generator may be enclosed in a fiberglass pack that pops off or breaks when the pneumatic bladder inflates.

Figure 2B:
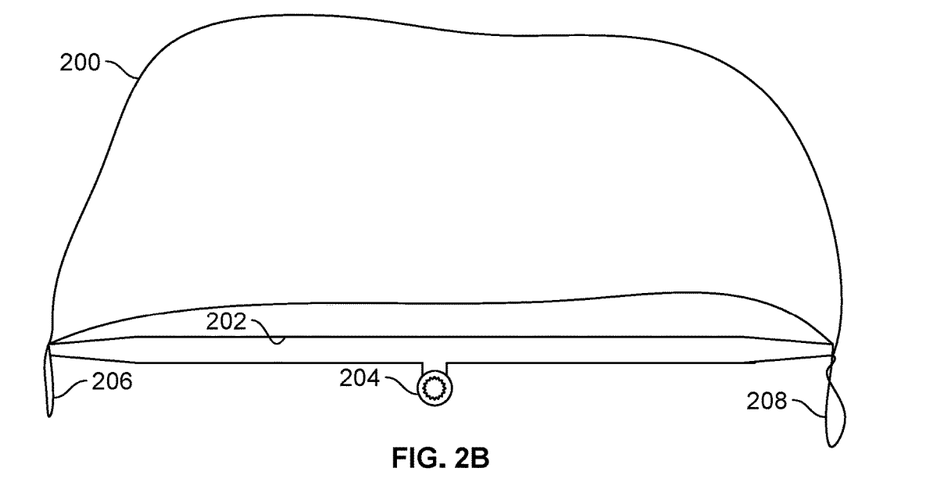
FIG. 2B is a diagram illustrating an embodiment of a pneumatic parachute deployment system after deployment.

FIG. 2B is a diagram illustrating an embodiment of a pneumatic parachute deployment system after deployment. In the example shown, pneumatic bladder 202 has expanded from a packed state to an inflated state. The bladder as shown has expanded to the left and to the right, pushing two sides of the parachute apart and widening the parachute opening. The pneumatic bladder may take less than a second or around 0.06 seconds to fully deploy. In some embodiments, ends of the bladder are open. In some embodiments, ends of the bladder are closed. Pressure from air generated may cause the bladder to explode after it reaches its maximum capacity. In the event the bladder explodes, the bladder may still first reach its maximum fill and push open the parachute's opening.

In the example shown, tethers 206 and 208 hang below the canopy of parachute 200. Pneumatic tube 202 may push directly on fabric of the canopy. The tethers may be attached to reinforced patches on the parachute.

Figure 3:
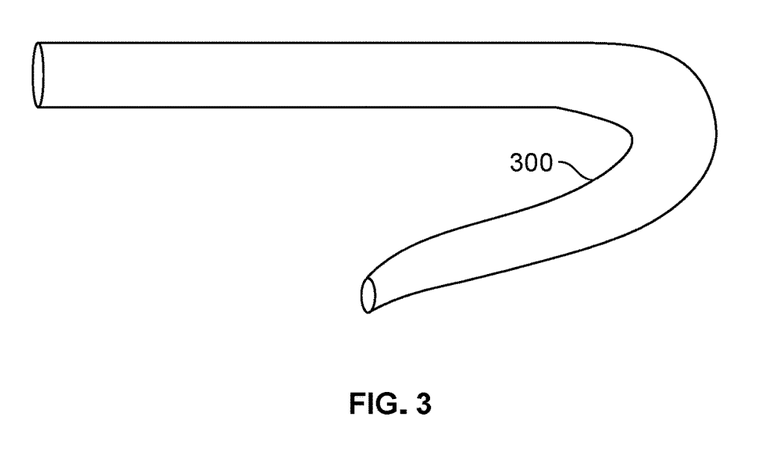
FIG. 3 is a diagram illustrating an embodiment of a collapsed pneumatic bladder.

FIG. 3 is a diagram illustrating an embodiment of a collapsed pneumatic bladder. In some embodiments, a pneumatic bladder may collapse or fold in on itself when it is filled with air. A collapsed pneumatic bladder may not be effective in shortening a parachute's deploy time. In the example shown, pneumatic bladder 300 is bent. Instead of extending straight in one direction, it is folded. A pneumatic bladder of a pneumatic parachute deployment system may be configured to extrude correctly in one direction. The bladder may be divided into sections that are inflated consecutively.

Figure 4A:
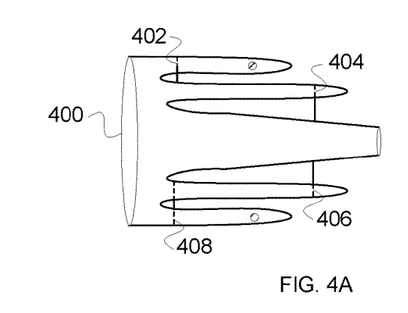
FIG. 4A is a diagram illustrating an embodiment of a packed pneumatic bladder.

FIG. 4A is a diagram illustrating an embodiment of a packed pneumatic bladder. In the example shown, pneumatic bladder 400 is folded into itself. The bladder may comprise a sleeve of fabric. A first end of the sleeve may be pulled inside out and folded over until the end of the sleeve is lined up with or close to a second end of the sleeve. The first end may then be folded over another time such that the end of the sleeve is lined up with an initial point of inversion of the first end. The pneumatic bladder may be folded over on itself multiple times. Sections of the folds may be secured with a semi-permanent fixture. The fixture may comprise a stitch, an adhesive, a snap button, or any appropriate fixture. The semi-permanent fixture may come undone when exposed to an amount of force exceeding a predetermined threshold. Multiple sections of the bladder may be secured with fixtures of differing strengths. The fixtures may be configured such that the bladder unfolds one section at a time.

In the example shown, pneumatic bladder 300 is secured with stitching. In the example shown, two outermost folds of the bladder are secured with stiches 402 and 408. Stiches 402 and 408 may be of equal strength. Two inner folds of the bladder are secured with stiches 404 and 406. Stiches 404 and 406 may be of equal strength. Stiches 404 and 406 may be stronger or more secure than stiches 402 and 408. Bladder 400 may be designed to be inflated from the left. The pneumatic bladder may be tapered. One end of the bladder may be smaller than the other. The bladder may be configured to be inflated from the end with a larger opening.

As the bladder is inflated from the left, the air may first break stiches 402 and 408 and inflate a leftmost section of the bladder. Air entering the bladder may then proceed to break stiches 404 and 406. As the bladder inflates, consecutive fixtures may be severed. In some embodiments, the bladder is inflated with a flow of air that increases in speed. Weaker fixtures may be broken before stronger fixtures.

Figure 4B:
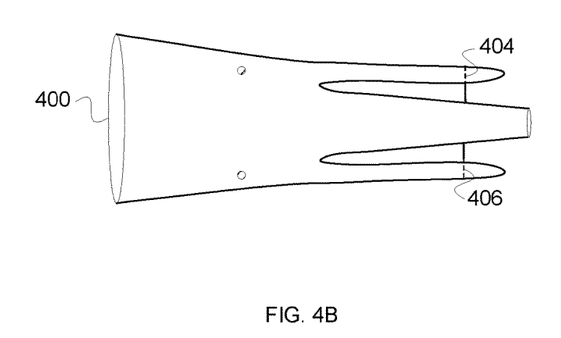
FIG. 4B is a diagram illustrating an embodiment of a pneumatic bladder during deployment.

FIG. 4B is a diagram illustrating an embodiment of a pneumatic bladder during deployment. In the example shown, pneumatic bladder 400 is in the process of being inflated from its left end. Stiches on outer folds of the bladder have come undone, releasing a section of the bladder. The bladder is inflated on its left half. Stiches 404 and 406 are intact, holding a fold in the bladder's right half. The bladder may be designed to inflate from its left to its right.

Figure 4C:
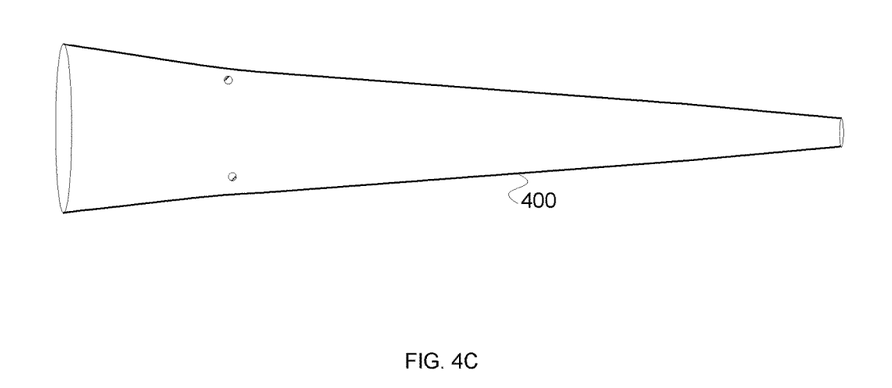
FIG. 4C is a diagram illustrating an embodiment of a pneumatic bladder after deployment.

FIG. 4C is a diagram illustrating an embodiment of a pneumatic bladder after deployment. In the example shown, all stiches in the bladder have been broken. Bladder 400 is fully inflated. A right end of the bladder may exert a force on a canopy of a parachute. As shown, circular markings are made on bladder 400, illustrating how the bladder unfolds.

Figure 5A:
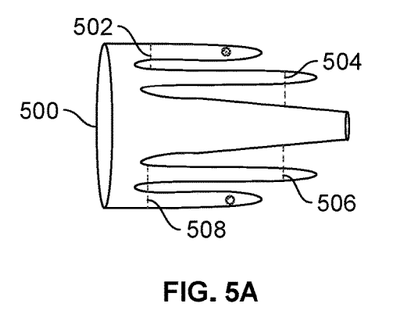
FIG. 5A is a diagram illustrating an embodiment of a packed pneumatic bladder.

FIG. 5A is a diagram illustrating an embodiment of a packed pneumatic bladder. In the example shown, pneumatic bladder is folded over itself multiple times. Stiches 502 and 508 secure outer folds of the bladder. Stiches 504 and 506 secure inner folds of the bladder. In the example shown, stiches 502 and 508 may be stronger than stiches 504 and 506. Each fold in the bladder may be secured with a singular fixture. For example, stich 504 and 506 may comprise one continuous stitch. The bladder may be designed to be inflated gradually from its rightmost end to its leftmost end.

Figure 5B:
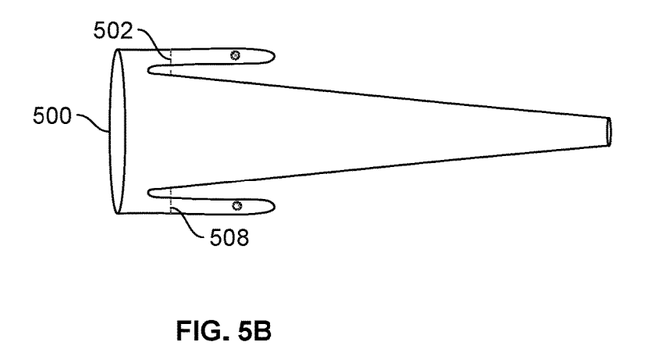
FIG. 5B is a diagram illustrating an embodiment of a pneumatic bladder during deployment.

FIG. 5B is a diagram illustrating an embodiment of a pneumatic bladder during deployment. In the example shown, stiches 504 and 506 have come undone. The bladder may be inflated from its left side. The bladder may be inflating section by section beginning with its far end. Stiches 502 and 508 secure a fold near the bladder's left end. The force exerted from air that is being blown into the bladder's left end may be strong enough to break stiches 504 and 506 but not strong enough to break stiches 502 and 508.

Figure 5C:
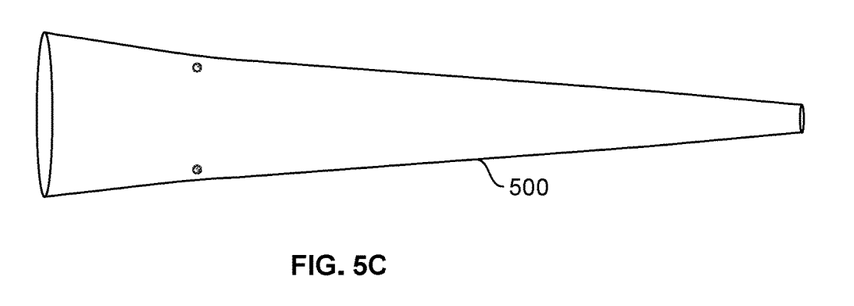
FIG. 5C is a diagram illustrating an embodiment of a pneumatic bladder after deployment.

FIG. 5C is a diagram illustrating an embodiment of a pneumatic bladder after deployment. In the example shown, pneumatic bladder 500 is fully inflated. The pneumatic bladder may be configured to inflate without bending or collapsing. As shown, circular markings are made on bladder 500, illustrating how the bladder unfolds.

Figure 6:
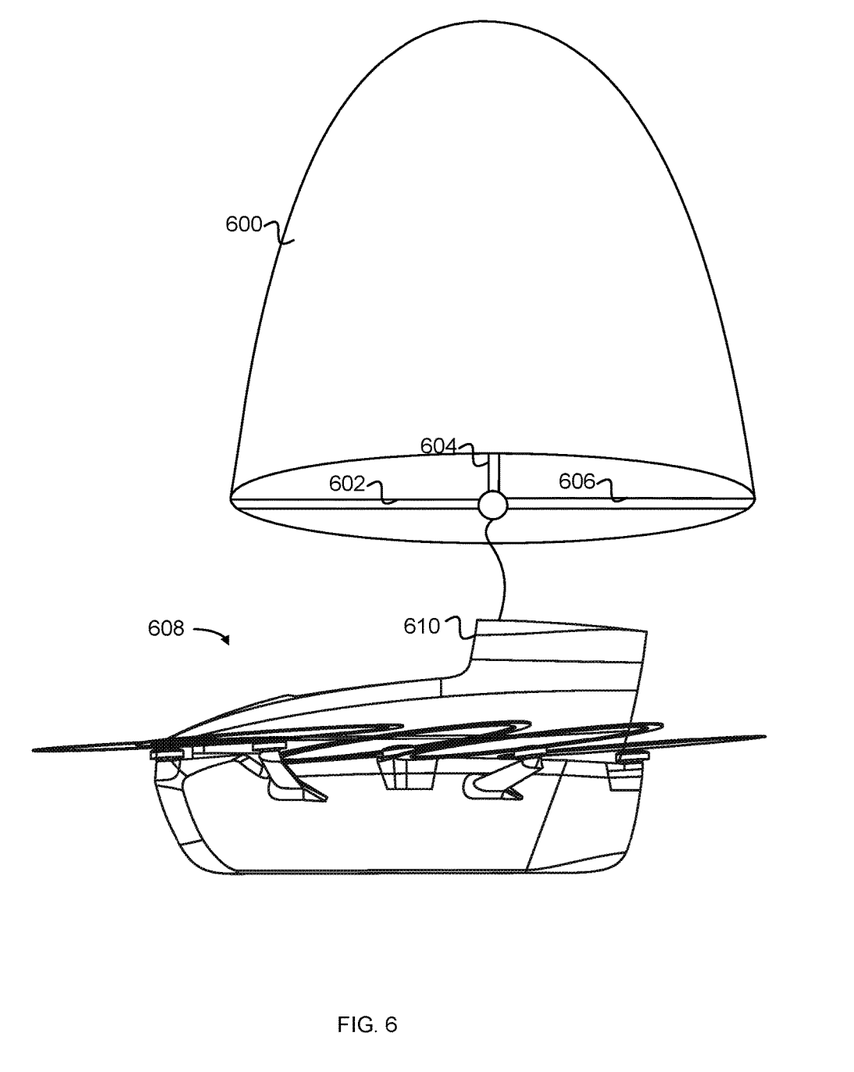
FIG. 6 is a diagram illustrating an embodiment of an aircraft comprising a pneumatic parachute deployment system.

FIG. 6 is a diagram illustrating an embodiment of an aircraft comprising a pneumatic parachute deployment system. In the example shown, a pneumatic parachute deployment system is used to recover aircraft 608. Aircraft 608 has an extrusion 610 atop the aircraft. The pneumatic system is attached atop the extrusion 610. An aircraft that comprises a pneumatic parachute deployment system may be shaped to have a mounting spot for the pneumatic parachute. The mounting spot may be isolated from a main body of the aircraft. Pneumatic bladders may be attached to the aircraft. They may be mounted away from parts of the aircraft that may snag or rip the bladders. In the example shown, pneumatic bladders 602, 604, and 606 push an opening of parachute 600 wider. The pneumatic bladders are attached to a common point on the aircraft. The parachute may be released from atop aircraft 608 and the pneumatic bladders may be deployed simultaneously. The pneumatic bladders may then detach from the parachute canopy, allowing the parachute to move further from the aircraft. The parachute may be attached to the aircraft via a bridle.

In some embodiments, the pneumatic parachute deployment system may be detached from the aircraft. The parachute may deploy with the pneumatic parachute deployment system in tow, including an airbag charge or other inflation device. The pneumatic parachute deployment system may trigger after the parachute is a considerable distance above the aircraft. The pneumatic parachute deployment system may be attached to the aircraft in order to limit a distance the aircraft falls before the parachute is inflated. The system may be attached to the aircraft in the event the system's weight in relation to wing loading causes the aircraft to be unstable when detached.

Figure 7A:
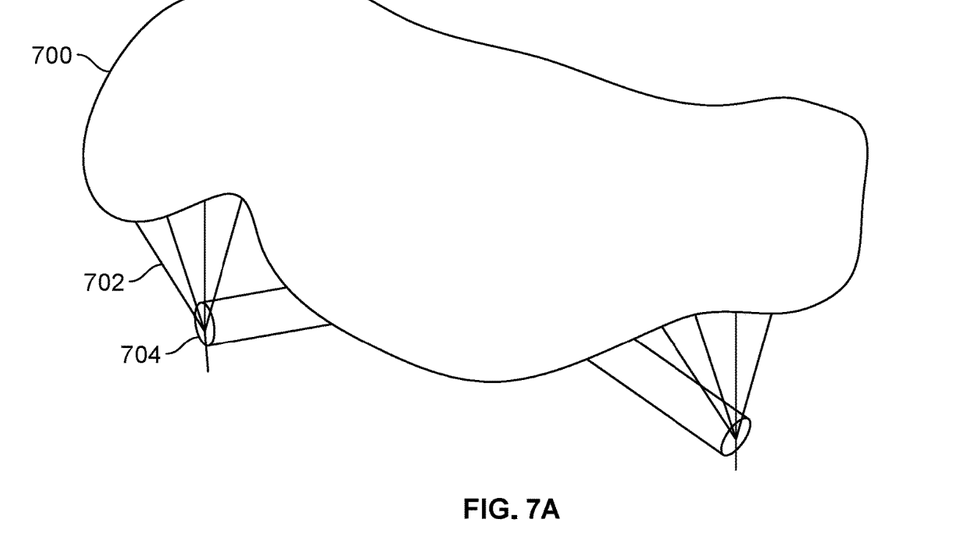
FIG. 7A is a diagram illustrating an embodiment of a pneumatic parachute deployment system after deployment.

FIG. 7A is a diagram illustrating an embodiment of a pneumatic parachute deployment system after deployment. In some embodiments, a pneumatic bladder of the pneumatic parachute deployment system exerts a force on a tether of the parachute. The pneumatic bladder may push tethers of the parachute far apart from each other, causing a main opening of the parachute to widen. Groups of tethers may be attached to ends of one or more pneumatic bladders. In the example shown, parachute 700 is pushing open via multiple pneumatic bladders. Pneumatic bladder 704 pushes on group of tethers 702. In some embodiments, the bladders are temporarily attached to the tethers.

Figure 7B:
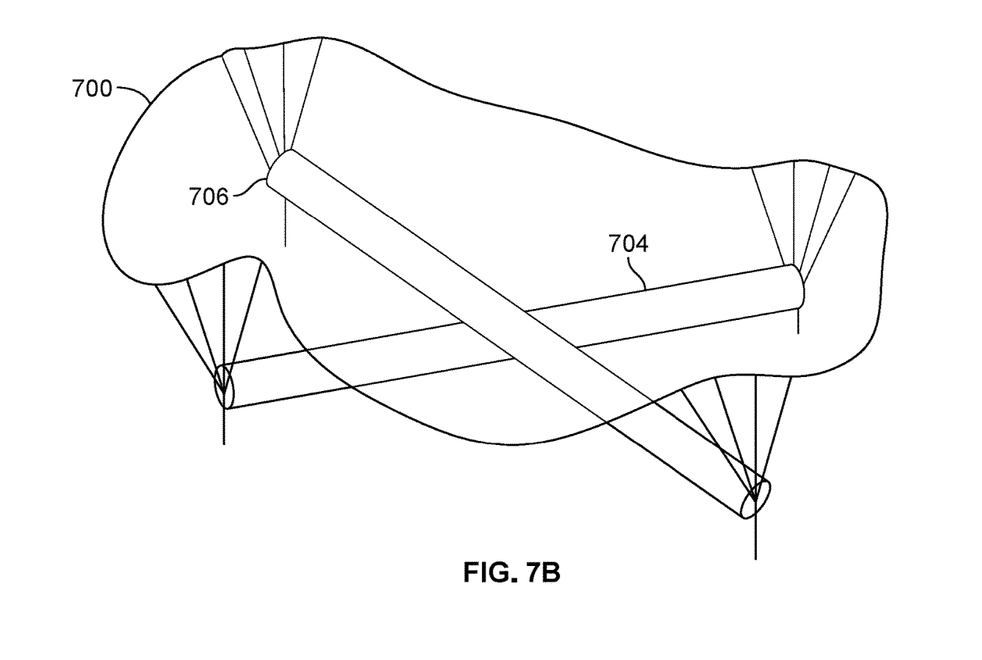
FIG. 7B is a diagram illustrating an embodiment of a pneumatic parachute deployment system after deployment.

FIG. 7B is a diagram illustrating an embodiment of a pneumatic parachute deployment system after deployment. The example shows a transparent view of parachute 700, exposing the pneumatic bladders deployed. Pneumatic bladder 706 is crossed over pneumatic bladder 704. The bladders may be perpendicular. In some embodiments, bladders are positioned with bladder ends equidistant around a center of the parachute. Multiple separate bladders may be used. Each bladder may comprise a separate inflation device. One large connected shape may be used. For example, the bladders may expand in a cross shape and share one inflation point.

In the example shown, pneumatic bladder 706 has four tethers attached to either end of the bladder. Pneumatic bladder 704 also has four tethers attached to either end. Parachute 700's tethers may be distributed evenly across the bladder ends.

A parachute's tethers may be divided into multiple groupings. Tethers in a same grouping of tethers may be attached to each other. After tethers in the grouping of tethers intersect, they may be woven into one conjoined tether. In some embodiments, a flat surface may be attached at or near a point where tethers in a grouping of tethers are attached. A pneumatic bladder may be attached to the surface or an object attached to the parachute or exert a force on the surface.

Figure 8A:
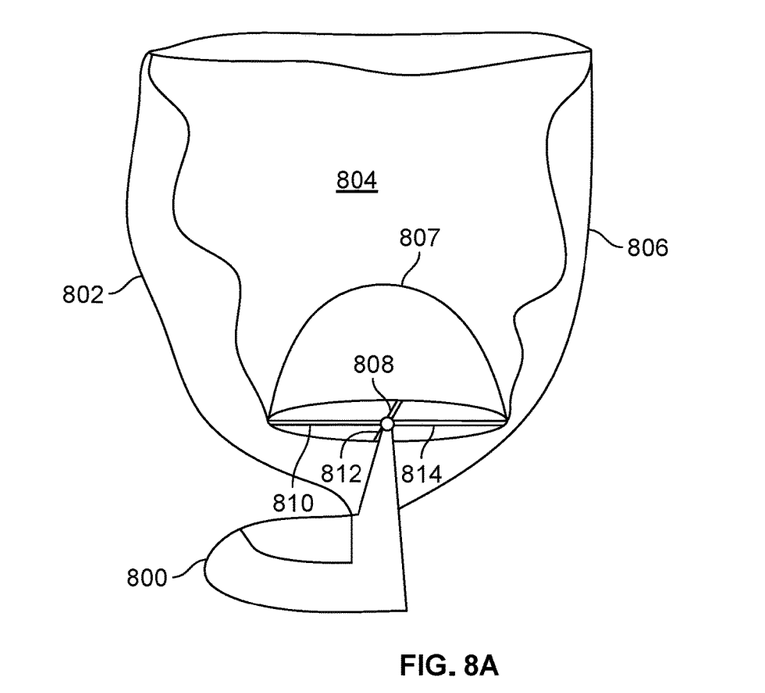
FIG. 8A is a diagram illustrating an embodiment of a pneumatic parachute deployment system after deployment.

FIG. 8A is a diagram illustrating an embodiment of a pneumatic parachute deployment system after deployment. In the example shown, aircraft 800 has deployed parachute 804. Dome-like portion 807 of the parachute is inflated. Pneumatic tubes 808, 810, 812, and 814 have deployed and pushed open the parachute canopy, causing portion 807 to inflate. The tubes as shown are attached away from a main opening of the parachute. In various embodiments, a pneumatic tube is attached to a parachute using a strap, metal grommet, rope, stich, bolt, or any other appropriate mechanism. As shown, the parachute's canopy excluding portion 807 billows up and around portion 807. The rest of the canopy may be inverted, crumpled, or not filled with air. Tethers 802 and 806 attach parachute 802 to aircraft 800. The tethers may attach to a bridle on the aircraft or be attached at structurally secure points on the aircraft's frame.

A parachute's expansion may be exponential. Accelerating beginning stages of the parachute's inflation may be critical. Using a pneumatic parachute deployment system to throw open a parachute near a top of the parachute may allow the parachute to fill quickly. The pneumatic tubes may be held in the position shown in FIG. 8A until the aircraft falls at a low speed. Releasing parachute 804 all at once may cause the canopy to rip or be compromised due to large loads. The pneumatic tubes may be attached or detached via mechanical or electrical means. The pneumatic tubes may be released via a pin puller, an explosive bolt, a primer cord, a severing device, or any appropriate mechanism. The tubes may be attached via tethers that are later cut or burned.

Figure 8B:
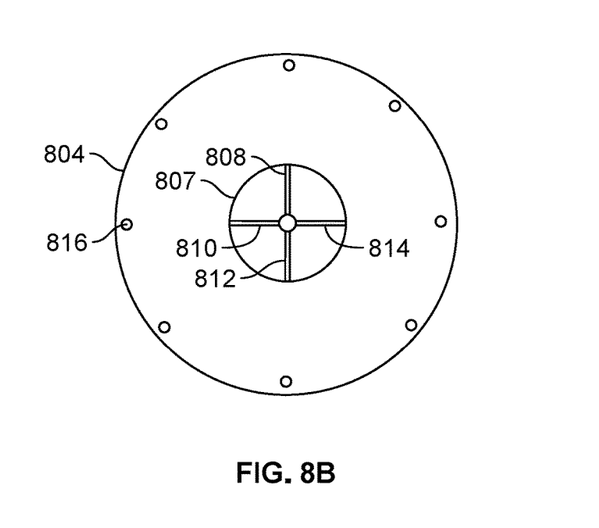
FIG. 8B is a diagram illustrating a parachute of a pneumatic parachute deployment system.

FIG. 8B is a diagram illustrating a parachute of a pneumatic parachute deployment system. Parachute 804 is shown from an overhead view. Dome portion 807 may be inflated. Portion 807 may be caused by pneumatic tubes 808, 810, 812, and 814. Tethers may be attached at point 816 and corresponding points around an edge of parachute 804. The points may surround a main opening of the parachute.

Figure 9A:
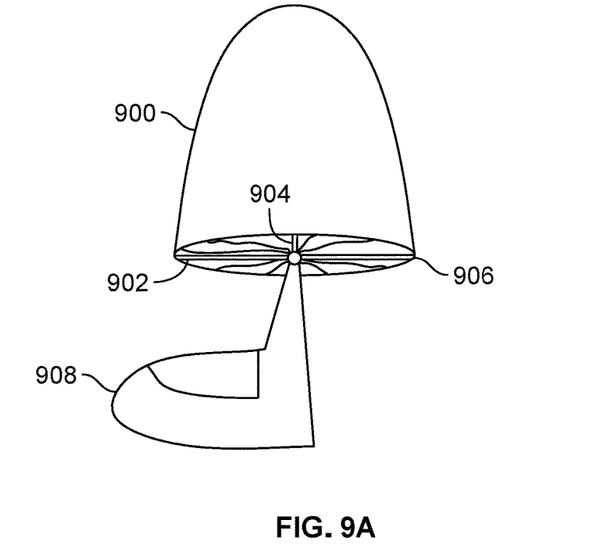
FIG. 9A is a diagram illustrating an embodiment of a pneumatic parachute deployment system constraining a parachute.

FIG. 9A is a diagram illustrating an embodiment of a pneumatic parachute deployment system constraining a parachute. In the example shown, aircraft 908 has deployed parachute 900. Parachute 900 has been deployed using a pneumatic parachute deployment system. In the example shown, pneumatic bladders 902, 904, and 906 have pushed the opening in parachute 900 wide open. The parachute is attached to the aircraft via tethers that may have slack. The tethers may be loose because the parachute is held close to the aircraft. In some embodiments, a pneumatic bladder is attached to the parachute. The pneumatic bladder may be attached to a canopy, tether, or an object that is secured to the parachute.

In some embodiments, the pneumatic parachute deployment system is used to cause a parachute to deploy quickly by widening the parachute's opening. The system may operate based on conditions. For example, in the event the aircraft is falling at a high speed, the system may not deploy a pneumatic bladder. The aircraft's speed may cause the parachute to open quickly already. In the event the aircraft is falling at a slow speed, the one or more pneumatic bladders may be deployed to shorten an amount of time until the parachute is fully filled.

In some embodiments, the bladders are attached to the parachute and constrain the parachute. The pneumatic bladders may be used to slow down filling of the parachute when it is deployed at high speeds. Limiting a size of the opening of the parachute may decrease a likelihood of the parachute ripping. Limiting the size of the opening may decrease a load experienced by the parachute. The one or more bladders may hold the parachute's opening in towards a center of the parachute, preventing the parachute's opening from widening. The one or more bladders may inflate slowly, causing the parachute to fill with air at a slower rate than it would otherwise. The pneumatic parachute deployment system may comprise detachable pneumatic bladders that are by default attached to the parachute. The system may control whether the bladders are attached or detached and inflated or not inflated. The system may comprise sensors or communicate with external sensors to determine flight conditions. The external sensors may be located on the aircraft.

Figure 9B:
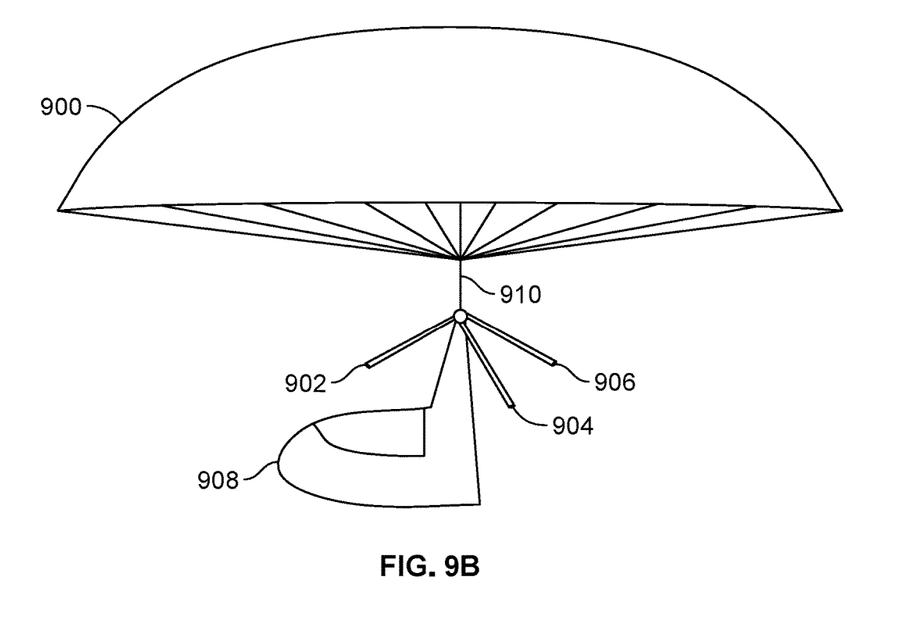
FIG. 9B is a diagram illustrating an embodiment of a pneumatic parachute deployment system releasing a parachute.

FIG. 9B is a diagram illustrating an embodiment of a pneumatic parachute deployment system releasing a parachute. In the example shown, pneumatic bladders 902, 904, and 906 have detached from parachute 900. In some embodiments, the system comprises a timer. The bladders may detach following a predetermined delay from bladder deployment or parachute deployment. Parachute 900 has fully filled with air. The parachute is attached to aircraft 908 via riser 910. The tethers and riser of the parachute are pulled taut. Parachute 900 is released from its prior position as shown in FIG. 9A and is positioned further above aircraft 908. Pneumatic bladders 902, 904, and 906 may have open ends and deflate soon after they are extruded.

Figure 10:
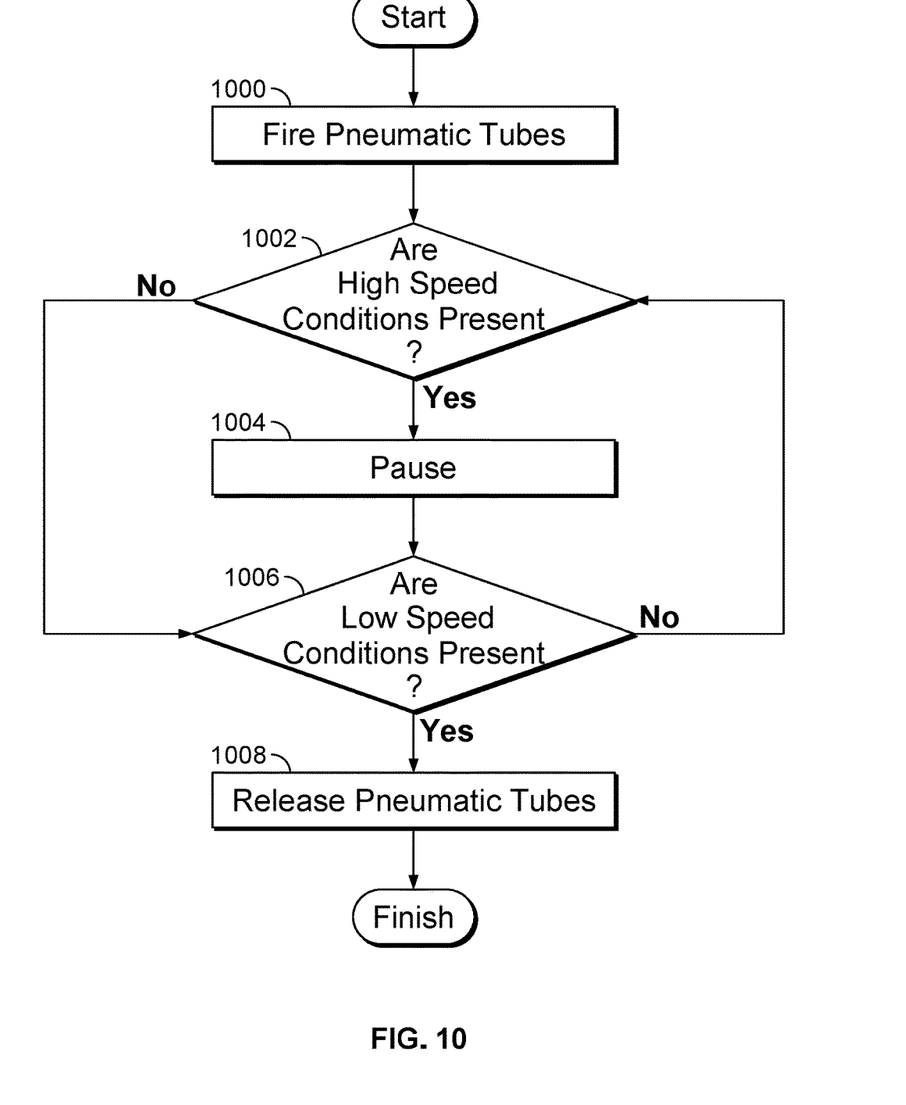
FIG. 10 is a flow diagram illustrating an embodiment of pneumatic parachute deployment system control process.

FIG. 10 is a flow diagram illustrating an embodiment of pneumatic parachute deployment system control process. In 1000, pneumatic bladders are fired. Firing the pneumatic bladders may comprise triggering a process that causes a production of gas. The pneumatic bladders are caused to inflate. In 1002, it is determined whether high speed conditions are present. Condition information may be detected via sensors. In the event high speed conditions are present, in 1004 the system pauses. The pneumatic bladders may be attached to the parachute and constrain the parachute by default. The pneumatic bladders may constrain the parachute to have an opening with a diameter limited by a length of a pneumatic bladder.

In 1006, it is determined whether low speed conditions are present. In the event low speed conditions are not present, the process returns to 1002. At high or intermediate speeds, the parachute may remain constrained. In the event low speed conditions are present, in 1008 the pneumatic bladders are released. Releasing the bladders may allow the parachute to inflate fully. At low speeds, the parachute may experience low risks of being compromised via rips or tears. Employing a pneumatic parachute deployment system that is condition-based may allow the aircraft to carry only one parachute on board as opposed to multiple parachutes suited for different conditions. Carrying one parachute may allow the aircraft to fulfil weight limitations or be more aerodynamic. A condition-based system may increase chances of aircraft recovery or limit damages.

In some embodiments, all speeds may be classified as either high or low. In the event high speed conditions are determined to be present in 1002, the process may proceed to releasing pneumatic tubes in 1008. In the event high speed conditions are determined to be absent in 1002, the process may proceed to pause in 1004 and return to 1002. In some embodiments, the aircraft will either be traveling at a high altitude and a high speed or at a low altitude and a low speed.

The pneumatic parachute deployment system may comprise one or more processors. It may comprise a computer memory or storage device. In some embodiments, instructions for controlling components of the deployment system are provided by a processor. Instructions may be stored in the computer memory. In some embodiments, the pneumatic parachute deployment system is fully mechanical. The system may comprise switches or any other appropriate apparatus.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A parachute deployment system, comprising:
   a bladder configured to:
      control a parachute's expansion in at least one dimension, wherein the bladder includes a plurality of inflatable sections at least two of which are unequal in length, wherein the bladder is initially attached to the parachute and constrains a radius of an opening of the parachute from exceeding a predetermined length, wherein the controlling of the parachute's expansion comprises to:
         determine whether an aircraft utilizing the system is traveling at high speeds;
         in response to a determination that the aircraft utilizing the system is traveling at high speeds:

continue to constrain the radius of the opening of the parachute;

while the radius is constrained, determine whether the aircraft utilizing the system is traveling at low speeds; and in response to a determination that the aircraft utilizing the system is traveling at low speeds, release the parachute from the bladder to allow the radius of the opening of the parachute to exceed the predetermined length; and an inflation mechanism configured to inflate the bladder.

2. The system of claim 1, wherein an end of the bladder is in contact with the parachute.

3. The system of claim 1, wherein an end of the bladder is attached to an aircraft and an opposite end of the bladder is in contact with the parachute.

4. The system of claim 1, wherein the bladder is inflated when the parachute is deployed.

5. The system of claim 1, wherein one or more additional bladders are used.

6. The system of claim 1, wherein multiple bladders are interconnected and inflated from a common point.

7. The system of claim 1, wherein the bladder exerts a force on a canopy of the parachute from within the canopy.

8. The system of claim 1, wherein the bladder pushes tethers of the parachute out from a center of the parachute.

9. The system of claim 1, wherein the bladder is folded inside of itself and the plurality of inflatable sections are defined by the folding of the bladder.

10. The system of claim 1, wherein the bladder is configured to be inflated a section at a time.

11. The system of claim 9, wherein a fold in the bladder is secured using a fixture that breaks when a predetermined amount of force is exerted on the fixture.

12. The system of claim 1, wherein the bladder is packed or folded using multiple fixtures of different strengths.

13. The system of claim 1, wherein the system performs actions based on flight conditions.

14. The system of claim 1, wherein the bladder is used to increase a radius of an opening of the parachute quickly in the event the aircraft utilizing the system is traveling at low speeds.

15. The system of claim 1, wherein the bladder is detached from the parachute in the event the aircraft utilizing the system is traveling at low speeds.

16. The system of claim 1, wherein the bladder is attached to one or more tethers of the parachute, a canopy of the parachute, or an object attached to the parachute.

17. The system of claim 1, wherein a rate of inflation of the bladder is determined based on flight conditions.

* * * * *